United States Patent [19]

Chen

[11] Patent Number: 5,820,415
[45] Date of Patent: Oct. 13, 1998

[54] SCREW SOCKET FOR AN ELECTRIC BULB

[76] Inventor: Ching Chao Chen, No. 511, Sec. 3, Ton-Da Rd., Hsin-Chu City, Taiwan

[21] Appl. No.: 365,368

[22] Filed: Dec. 28, 1994

[51] Int. Cl.[6] .................................................. H01R 13/40
[52] U.S. Cl. ............................................................. 439/665
[58] Field of Search ..................................... 439/665, 736, 439/419, 340, 602, 611, 699.2, 613, 375, 336, 842, 356

[56] References Cited

U.S. PATENT DOCUMENTS

| 959,977 | 5/1910 | Woshburn et al. ..................... 439/665 |
| 3,027,533 | 3/1962 | Monson .................................. 439/665 |
| 3,251,023 | 5/1966 | Schick ..................................... 439/665 |
| 4,541,605 | 9/1985 | Kubota et al. .......................... 249/142 |
| 4,778,409 | 10/1988 | Maddock ................................ 439/602 |
| 4,836,801 | 6/1989 | Ramirez .................................. 439/665 |
| 4,919,608 | 4/1990 | Catalanotti et al. ................... 425/556 |
| 5,176,532 | 1/1993 | Herzog et al. ......................... 439/340 |

*Primary Examiner*—Neil Abrams
*Assistant Examiner*—Brian J. Biggi
*Attorney, Agent, or Firm*—Harold L. Novick; Nath & Associates

[57] ABSTRACT

The present invention relates to a screw socket, wherein the screw area is formed on the inner wall of the neck of the screw socket for receiving a screwed in electric bulb. The screw area is composed of a pair of screws which occupy no more than ¼ circumference and are opposite to each other. The male mold used for forming the above screws includes active molds with respect to the above screw area, and the precision of the screw threads is kept within the proper tolerence during an injection molding thereof.

13 Claims, 1 Drawing Sheet

SCREW SOCKET FOR AN ELECTRIC BULB

BACKGROUND OF THE INVENTION

The present invention relates to a screw socket in general and it particularly relates to a screw socket in which an electric bulb of the type E-12 or E-17 is screwed and then connected serially in Christmas lights.

BRIEF DESCRIPTION OF THE PRIOR ART

The screw socket of the conventional electric bulb connected serially in Christmas lights provides a screw area for receiving the bulb, wherein a serial screw is formed on the inner wall of the neck of the screw socket with respect to the base of the electric bulb. For forming the foregoing screw in injection molding, theoretically, a rotary mold is used as a male mold. But observing the configuration, the metallic contact lamellas are engaged on the longitudinal grooves of the inner wall of the screw socket for making the circuit of the electric bulb, and the screw socket produced by monoblock molding is a device with longitudinal groove. Therefore the screw is unable to be formed by the process of the rotary mold.

For solving the problem of the aforedescribed process, the method of forcing a lost mold which moves the male mold longitudinally is used commercially. However, the surface of the screw formed by such process is inevitably damaged by the male mold when it is withdrawn, so the precision of the screw to be kept effectively within the common difference of 0.2 mm which is the examining standard of U.S. domestic sale is inconsistent.

SUMMARY OF THE INVENTION

From the foregoing description, the screw area is formed on the inner wall of the neck of the screw socket for screwing the electric bulb, wherein the screw area is composed of a pair of screws which occupy no more than ¼ of the circumference and are opposite to each other. The male mold used for forming the screw includes active molds with respect to the screw area. By the shrinkage of the active molds, the damage on the surface of the screw is avoidable when the male mold is withdrawn longitudinally, and the precision is kept exactly within the tolerance or common difference.

DETAILED DESCRIPTION OF THE PREFERRED EMBODIMENT

Figure 1:
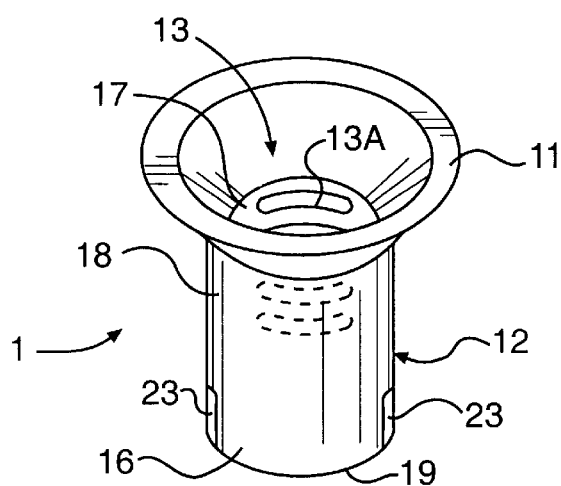
FIG. 1 is a perspective view of a screw socket according to the present invention.
Figure 2:
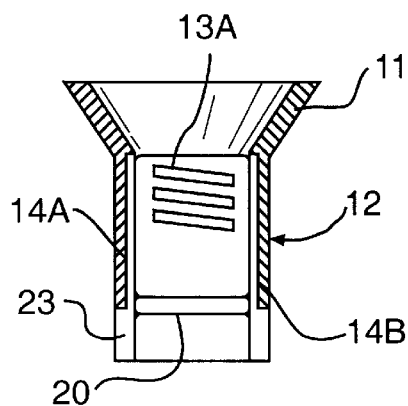
FIG. 2 is an axial cross sectional view of FIG. 1 depicting the screw area of the screw socket.
Figure 5:
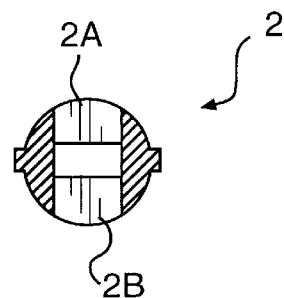
FIG. 5 is a radial cross sectional view of a male mold which forms the screw of the screw socket, it depicting the convex state of the active molds.
Figure 3:
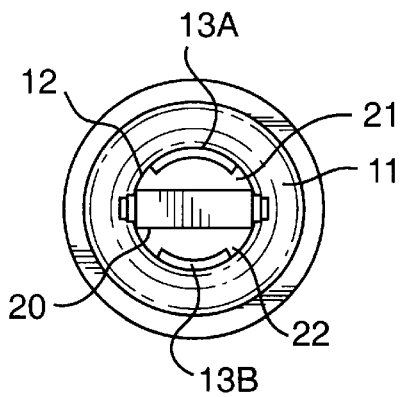
FIG. 3 is a top plan view of the screw socket of FIG. 1.

As shown in FIGS. 1, 2, and 3, a one piece screw socket (1) produced by a monoblock molding process and in accordance with this invention is depicted. The socket includes a truncated conical opened part (11) and a cylindrical neck part (12) integral with part 11, neck part 12 having a continuous wall 16 with an inside surface 17, an outside surface 18, and a bottom 19. Spaced axially from bottom 19 is a bar 20 that extends between two opposing sides of inside wall surface 17. Thus bar 20 and wall surface 17 define two arcuate slots 21 and 22 which extend axially through bottom 19 of neck part 12. A screw area (13) for screwing an electric bulb of the type E-12 or E-17 is located on the inner wall of neck part (12) of screw socket (1). Screw area (13) is composed of a pair of screw threads (13A, 13B) extending radially inwardly from inside surface 17, and which occupy no more than ¼ of the circumference Screw threads (13A, 13B) and are located opposite to each other and above slots 21 and 22. Grooves (14A, 14B) for engaging a metallic contact lamellas (15A and 15B)(FIG. 4) are located on the remaining area which is not occupied by the screw threads (13A, 13B) in the inner wall of the neck part (12) of screw socket (1).

Figure 4:
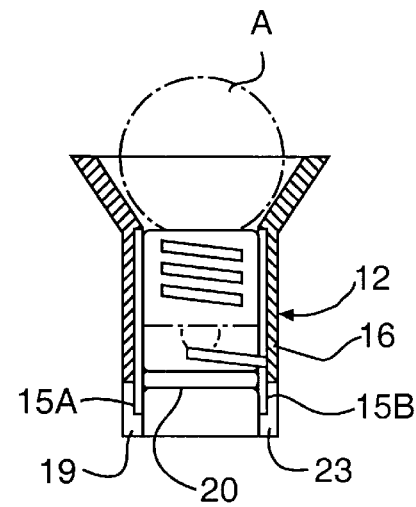
FIG. 4 is an axial cross sectional view of the screw socket in which an electric bulb has been screwed.

Screw area (13) of the neck part (12) of the screw socket (1), as characterized hereinbefore, is used for screwing an electric bulb (A) of the type E-12 or E-17. As shown in FIG. 4, a small electric bulb (A) is located by screw threads (13A, 13B) in the screw area (13). The base of bulb (A) comes into contact with metallic contact lamellas (15A, 15B) for making an electric circuit. A radial slot 23 extends completely across the bottom 19 of wall 16 and, as shown in FIG. 4, the bottoms of lamellas 15A, 15B extend into slot 23.

The screw area (13) in the inner wall of the neck part (12) is formed by a pair of screw threads (13A, 13B) which occupy no more than ¼ of the circumference and are located opposite to each other.

The process for making these threads is that a male mold (2) the diameter of which corresponds to the inner diameter of the screw socket (1) is used in monoblock injection molding for forming the screw socket (1), and the male mold (2) is withdrawn from or put into the female mold in the axial direction of the screw socket (1).

Figure 6:
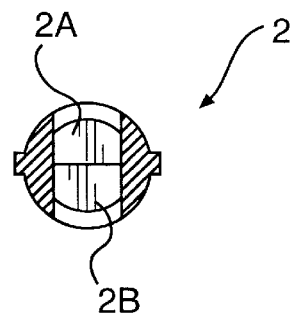
FIG. 6 is a radial cross sectional view of a male mold depicting the shrinkage state of the active mold in the male mold.

Furthermore, the foregoing male mold (2) includes the active mold portions (2A, 2B) with respect to the aforementioned screw threads (13A, 13B), and the active mold portions (2A, 2B) can be shrunk or withdrawn properly by the operator, as shown in FIG. 6.

During the injection molding of the screw socket (1), the active mold portions (2A, 2B) of the male mold (2) in the screw socket (1) are located inside the formed screw threads (13A, 13B). After the screw socket (1) is formed, the operator withdraws the active mold portions (2A, 2B) and the amount of shrinkage exceeds the range of screw threads (13A, 13B). Thus, the active mold portions (2A, 2B) have no contact with the above formed screw threads (13A, 13B) when the male mold (2) is withdrawn from the screw socket (1), and the precision of the screw threads (13A, 13B) is kept within the standard tolerance.

The active mold portions (2A, 2B) are withdrawn when the male mold is removed, the amount of shrinkage exceeds the range of screw threads (13A, 13B). Thus a design in which the active mold portions (2A, 2B) occupy no more than ¼ of the circumference is practical for reserving the space of shrinkage of active mold portions (2A, 2B) in the male mold (2).

I claim:

1. A screw socket for an electric bulb, comprising:
    a one piece, continuous, cylindrical neck having an axially extending orifice in said neck which is defined by an inner wall, said inner wall having a screw area for screwing in the electric bulb, wherein said screw area has only a pair of screw threads which each occupy no more than ¼ of the circumference of said inner wall and which are located opposite to each other.

2. A screw socket as claimed in claim 1, wherein said screw area has a plurality of pairs of screw threads which each occupy no more than ¼ of the circumference of said screw area.

3. A screw socket as claimed in claim 2, wherein said screw area has an axial portion on each side of said screw threads, and further including an axially extending groove located in each of said axial portions; and a metallic contact lamella located in each said axially extending grooves.

4. A screw socket as claimed in claim 1, wherein said screw area has an axial portion on each side of said screw threads, and further including an axially extending groove located in each of said axial portions; and a metallic contact lamella located in each said axially extending grooves.

5. A screw socket for an electric bulb comprising a one-piece, continuous cylindrical neck having an axially extending bore therein defined by an inner wall, said bore for receiving a bulb therein from a first end thereof; and a plurality of screw threads arranged in parallel in only two columns with at least two rows of screw threads in each column, each screw thread being slanted from said bore first end in an inwardly direction and having a length of no more than ¼ of the circumference of said bore.

6. A screw socket for an electric bulb as claimed in claim 5, and further comprising a truncated conical part integral with said neck and extending axially and radially outwardly from said first end of said neck bore.

7. A screw socket for an electric bulb as claimed in claim 6, and further comprising a bottom bar extending between opposite sides of said inner wall so as to define arcuate slots between sides of said bar and said inner wall.

8. A screw socket for an electric bulb as claimed in claim 7, wherein said bar is located spaced axially inwardly from a second end of said bore and is integral with said inner wall.

9. A screw socket for an electric bulb, comprising:

a housing produced by an injection molding process using active male molds so as to produce a one piece, continuous, cylindrical neck having an axially extending orifice in said neck defined by an inner surface of a wall, said inner wall surface having a screw area for screwing in the electric bulb, and only a pair of screw threads also produced during said injection molding process so as to be located opposite each other in said screw area, each of said screw threads occupying no more than ¼ of the circumference of said inner wall surface.

10. A screw socket for an electric bulb as claimed in claim 9, and further comprising a truncated conical part produced by said injection molding process so as to be integral with said neck at a first end thereof, and extending axially and radially outwardly from said first neck end.

11. A screw socket for an electric bulb as claimed in claim 9, and further comprising a bottom bar extending between opposite sides of said inner wall surface so as to define arcuate slots between sides of said bar and said inner wall surface.

12. A screw socket for an electric bulb as claimed in claim 11, wherein said bar is located spaced axially inwardly from one end of said orifice and is integral with said inner wall.

13. A screw socket for an electric bulb as claimed in claim 12, and further including a radially extending slot in said wall at one end thereof, said slot being located below said bar and through a part of said wall that is outside said screw area.

* * * * *